(12) United States Patent
Lienkamp et al.

(10) Patent No.: US 8,344,697 B2
(45) Date of Patent: Jan. 1, 2013

(54) METHOD FOR OPTIMIZED DESIGN AND OPERATION OF BATTERY COOLING SYSTEM IN ELECTRIC VEHICLES

(75) Inventors: Sebastian Lienkamp, Budenheim (DE); Remy Fontaine, Wiesbaden (DE); Marc Becker, Idstein (DE); Peter Kilian, Heidelberg (DE)

(73) Assignee: GM Global Technlogy Operations LLC, Detroit, MI (US)

( * ) Notice: Subject to any disclaimer, the term of this patent is extended or adjusted under 35 U.S.C. 154(b) by 347 days.

(21) Appl. No.: 12/848,702

(22) Filed: Aug. 2, 2010

(65) Prior Publication Data

US 2012/0025762 A1 Feb. 2, 2012

(51) Int. Cl.
*H01M 10/44* (2006.01)
*H01M 10/46* (2006.01)
(52) U.S. Cl. ........................................ 320/150
(58) Field of Classification Search .................. 320/107, 320/112, 132, 149, 150; 324/431
See application file for complete search history.

(56) References Cited

U.S. PATENT DOCUMENTS

| | | | | |
|---|---|---|---|---|
| 5,702,431 A | * | 12/1997 | Wang et al. | 607/61 |
| 6,087,036 A | * | 7/2000 | Rouillard et al. | 429/66 |
| 2008/0280192 A1 | * | 11/2008 | Drozdz et al. | 429/62 |

* cited by examiner

*Primary Examiner* — Edward Tso
(74) *Attorney, Agent, or Firm* — John A. Miller; Miller IP Group, PLC

(57) ABSTRACT

A method and system for controlling temperature in an electric vehicle battery pack such that battery pack longevity is preserved, while vehicle driving range is maximized. A controller prescribes a maximum allowable temperature in the battery pack as a function of state of charge, reflecting evidence that lithium-ion battery pack temperatures can be allowed to increase as state of charge decreases, without having a detrimental effect on battery pack life. During vehicle driving, battery pack temperature is allowed to increase with decreasing state of charge, and a cooling system is only used as necessary to maintain temperature beneath the increasing maximum level. The decreased usage of the cooling system reduces energy consumption and increases vehicle driving range. During charging operations, the cooling system must remove enough heat from the battery pack to maintain temperatures below a decreasing maximum, but this has no impact on driving range.

20 Claims, 3 Drawing Sheets

METHOD FOR OPTIMIZED DESIGN AND OPERATION OF BATTERY COOLING SYSTEM IN ELECTRIC VEHICLES

BACKGROUND OF THE INVENTION

1. Field of the Invention

This invention relates generally to electric vehicle battery pack thermal management and, more particularly, to a method and system for managing the temperature in an electric vehicle battery pack which allows the maximum temperature in the battery pack to rise as the state of charge of the battery pack drops, thus reducing energy expenditure on battery pack cooling and maximizing vehicle driving range, while still optimizing battery pack life.

2. Discussion of the Related Art

Electric vehicles are rapidly gaining popularity in today's automotive marketplace. Electric vehicles offer several desirable features, such as eliminating emissions and usage of petroleum-based fuels at the consumer level, and potentially lower operating costs. A key component of electric vehicles is the battery pack, which can represent a substantial proportion of the vehicle's cost. Battery packs in these vehicles typically consist of numerous interconnected cells, operating at a relatively high voltage, and delivering a lot of power on demand. Maximizing battery pack life is a key consideration in the design and operation of electric vehicles.

In order to maximize battery pack life, the temperature in the battery pack must be controlled during charging and discharging so that it does not exceed a certain level. Control systems in existing electric vehicles typically prescribe a maximum allowable temperature in the battery pack irrespective of state of charge, and use an onboard thermal management system to prevent battery pack temperature from rising above the prescribed limit. However, using the thermal management system to extract heat during driving operation consumes energy, which detracts from the driving range of the vehicle. It has now been observed that the life of lithium-ion battery packs is not significantly degraded if the temperature in the battery pack is allowed to rise somewhat when the battery pack is in a reduced state of charge. The higher allowable temperature at lower battery pack states of charge allows reduced energy usage by the thermal management system.

There is an opportunity to employ a battery pack cooling methodology which ensures optimum battery pack life, but also maximizes vehicle driving range by not expending energy to remove heat from the battery pack if that heat is not detrimental to the battery pack. Such a method could yield cost savings for manufacturers of electric vehicles through the use of a smaller cooling system, and increase customer satisfaction through improved vehicle driving range.

SUMMARY OF THE INVENTION

In accordance with the teachings of the present invention, a method and system are disclosed for controlling temperature in an electric vehicle battery pack such that battery pack longevity is preserved, while vehicle driving range is maximized. A controller prescribes a maximum allowable temperature in the battery pack as a function of state of charge of the battery pack. This control strategy reflects evidence that lithium-ion battery pack temperatures can be allowed to increase as battery pack state of charge decreases, without having a detrimental effect on battery pack life. During vehicle driving operations, battery pack temperature is allowed to increase with decreasing state of charge, and a battery pack cooling system is only used as necessary to maintain battery pack temperature beneath the increasing maximum level. The decreased use of the cooling system reduces energy consumption and increases vehicle driving range. During charging operations, the cooling system must remove enough heat from the battery pack to maintain temperatures below a maximum which decreases with increasing state of charge—but this does not impact vehicle driving range, as the battery pack cooling system is powered by the electrical grid during charging.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for optimized design and operation of a battery pack cooling system in electric vehicles is merely exemplary in nature, and is in no way intended to limit the invention or its applications or uses. For example, the present invention has particular application to electric vehicle battery packs, but may be equally applicable to battery packs in gasoline/electric hybrid vehicles, battery packs in utility vehicles, such as forklifts, and non-vehicle-based battery packs.

Longevity of battery packs and vehicle driving range are two key considerations in the design of an electric vehicle. It is well known in the industry that high temperatures can be detrimental to a battery pack, and most types of battery packs produce heat when being discharged during vehicle driving operations. Therefore, electric vehicles typically include an onboard cooling system, or thermal management system, to maintain battery pack temperatures below a certain level, which is known to be conducive to extending battery pack life. Thermal management systems in existing electric vehicles prescribe a single maximum allowable temperature in the battery pack, and the cooling system is engaged as necessary to maintain battery pack temperature beneath this fixed limit. However, operating the battery pack cooling system consumes energy, which detracts from the driving range of the vehicle.

Recent testing has revealed that the life of lithium-ion battery packs is a function of both temperature and state of charge of the battery pack, where a certain temperature may be detrimental to battery pack life if that temperature is experienced when the battery pack is in a high state of charge, but that same temperature is not at all detrimental to battery pack life if that temperature is experienced when the battery pack is in a lower state of charge. The present invention exploits this phenomenon with a thermal management system designed to preserve battery pack longevity, but also maximize electric vehicle driving range by judiciously using the cooling system and allowing the temperature in the battery pack to rise somewhat as state of charge falls during driving.

Figure 1:
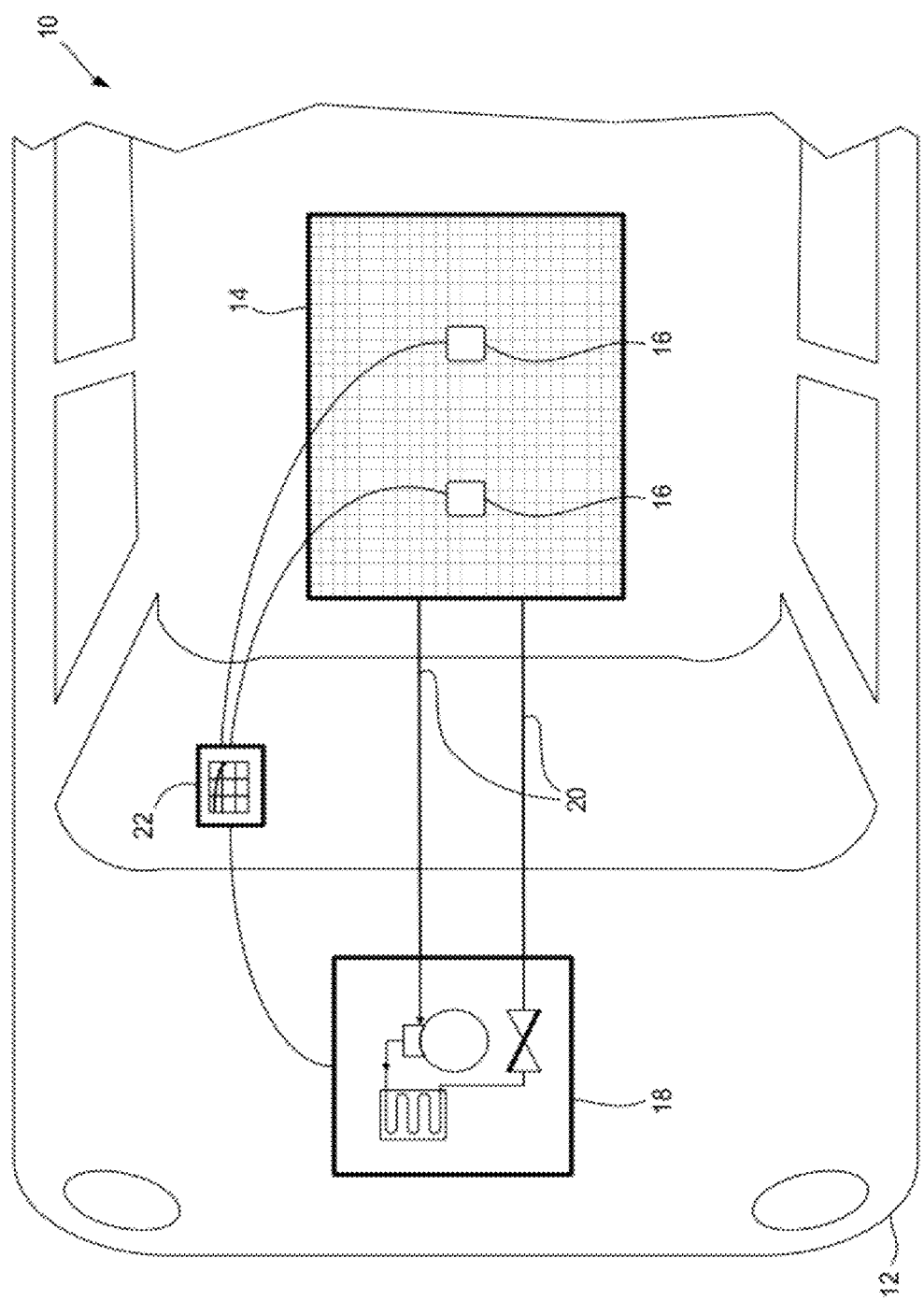
FIG. 1 is a schematic diagram of an electric vehicle battery pack thermal management system.

FIG. 1 is a schematic diagram of an electric vehicle battery pack thermal management system 10. A vehicle 12 uses electric motors (not shown) for propulsion, with electrical energy for the motors provided by a battery pack 14. The battery pack 14 is fitted with a plurality of sensors 16, including devices which monitor temperature and state of charge of the battery pack 14. Other parameters may also be monitored by the sensors 16, and temperature and state of charge may be measured at multiple locations throughout the battery pack 14 by the sensors 16. A cooling system 18 is used to remove heat from the battery pack 14 as necessary to maintain temperature in the battery pack 14 at or below a prescribed level which varies with state of charge, as will be discussed below. The cooling system 18 is connected to the battery pack 14 by coolant lines 20, which deliver a chilled coolant to the battery pack 14 and return a warmer coolant back to the cooling system 18. The cooling system 18 may be of any type suitable for the purpose described herein, including traditional refrigerant-based systems, two-stage systems which deliver a secondary fluid through the coolant lines 20, thermal storage systems which store heat from the battery pack 14 in a fluid and either dissipate the heat to the environment through a radiator or use the heat to warm the interior of the vehicle 12, and other types.

A controller 22 is used to control the cooling system 18, based on conditions in the battery pack 14 as monitored by the sensors 16. The controller 22 is in communication with the sensors 16 and the cooling system 18 via wired or wireless connection. The controller 22 is configured to engage the cooling system 18 as necessary to remove heat from the battery pack 14 in order to maintain temperature in the battery pack 14 at or below a prescribed level, where the prescribed maximum temperature is dependent on the state of charge of the battery pack 14, according to the following discussion.

Figure 2:
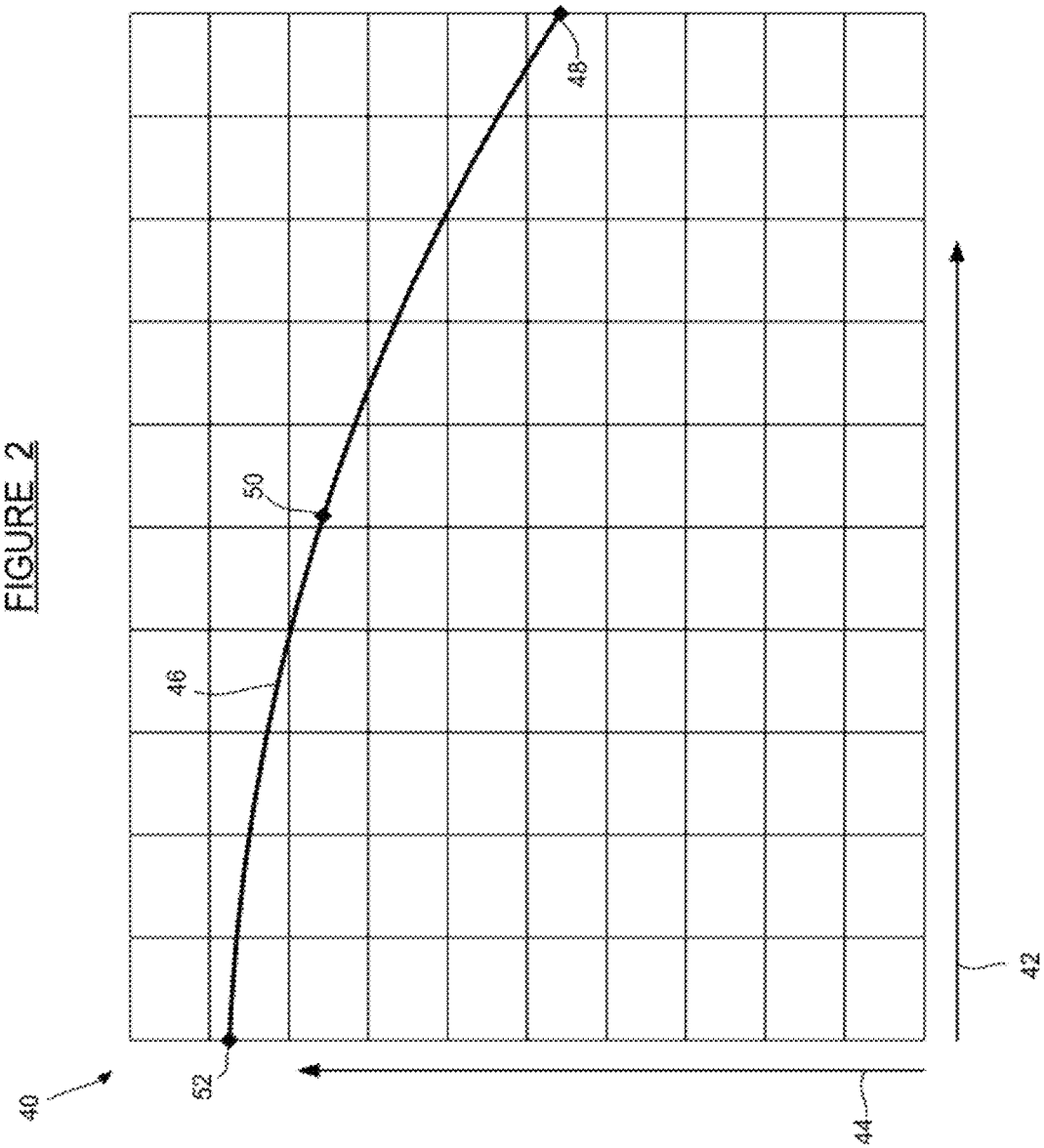
FIG. 2 is a graph of maximum allowable temperature in the battery pack as a function of state of charge, according to the present invention.

FIG. 2 is a graph 40 showing maximum allowable temperature in the battery pack 14 as a function of state of charge. The graph 40 plots state of charge of the battery pack 14 on horizontal axis 42, and maximum allowable temperature in the battery pack 14 on vertical axis 44. Curve 46 represents the maximum temperature in the battery pack 14 that may be permitted by the controller 22 in the thermal management system 10, at any particular state of charge. It can be seen at point 48 that the maximum allowable temperature is lowest where the battery pack 14 is fully charged. At point 50, the maximum allowable temperature is higher than at the point 48, as the state of charge is lower. And at point 52, where the battery pack 14 is nearly fully discharged, the maximum allowable temperature is highest.

The shape of the curve 46, representing maximum allowable battery pack temperature as a function of state of charge, is derived from two functional relationships. The first relationship is the battery pack degradation rate as a function of temperature and state of charge. Available data shows that degradation rates at a particular temperature are higher if the state of charge is higher. This data can be obtained from testing, engineering analysis or simulation, or other sources. The second relationship is the expected state of charge residence distributions of typical customers; in other words, how much time a typical customer's battery pack 14 spends near full charge, how much time near half charge, how much time nearly discharged, and so forth. This data can be obtained from field trials, actual customer vehicle usage, or other sources. The optimal shape of the curve 46 shall allow a high maximum battery pack temperature, thus minimizing the thermal management effort while still sustaining battery pack life, and also lead to homogenized degradation rates for all customers.

A control strategy which exploits the phenomenon seen in the curve 46 can increase the driving range of the vehicle 12, while preventing excessive degradation of the battery pack 14, as follows. Consider a situation where the battery pack 14 is fully charged and is at a uniform temperature as represented by the point 48 on the graph 40, as might be the case if the vehicle 12 had been parked in a parking lot during the day and plugged into an electrical outlet for charging. As a driver begins driving the vehicle 12, heat is produced in the battery pack 14, thus raising the temperature. A traditional electric vehicle thermal management system would never permit the temperature in the battery pack 14 to rise above the temperature represented by the point 48, and thus would immediately engage the cooling system 18 to prevent temperature rise.

However, the controller 22 of the present invention will monitor both temperature and state of charge of the battery pack 14. The controller 22 will allow the temperature in the battery pack 14 to rise as the state of charge falls, so that the maximum temperature never exceeds the level defined by the curve 46. For example, it may be the case that the actual temperature in the battery pack 14 reaches the curve 46 at the point 50, when the battery pack 14 is about half discharged. At that time, the cooling system 18 would be engaged and the temperature in the battery pack 14 would be maintained at or below the curve 46 for the duration of driving and discharging operations. The control strategy employed by the controller 22 not only delays the engagement of the cooling system 18, but also allows the cooling system 18 to operate on a lighter duty cycle than would be required in a traditional electric vehicle thermal management system. The reduced usage of the cooling system 18 results in an energy savings that can directly and significantly increase the driving range of the vehicle 12. In addition, the reduced cooling capacity requirements allow the manufacturer of the vehicle 12 to use a cooling system 18 which is smaller, lighter, and less expensive than one that would be required in a traditional electric vehicle thermal management system.

When the battery pack 14 needs to be recharged, it may be in a condition of high temperature and low state of charge as represented by the point 52 on the graph 40. Recharging the battery pack 14 also produces heat, although not as much heat as is produced by discharging. Therefore, as the battery pack 14 is recharged, the cooling system 18 must be operated such that the temperature in the battery pack 14 continues to drop as the state of charge increases. This may require continuous operation of the cooling system 18, but that is not a problem during charging operations, because the vehicle 12 is plugged into an electrical outlet and the power to both charge the battery pack 14 and operate the cooling system 18 is provided by the electrical grid.

Figure 3:
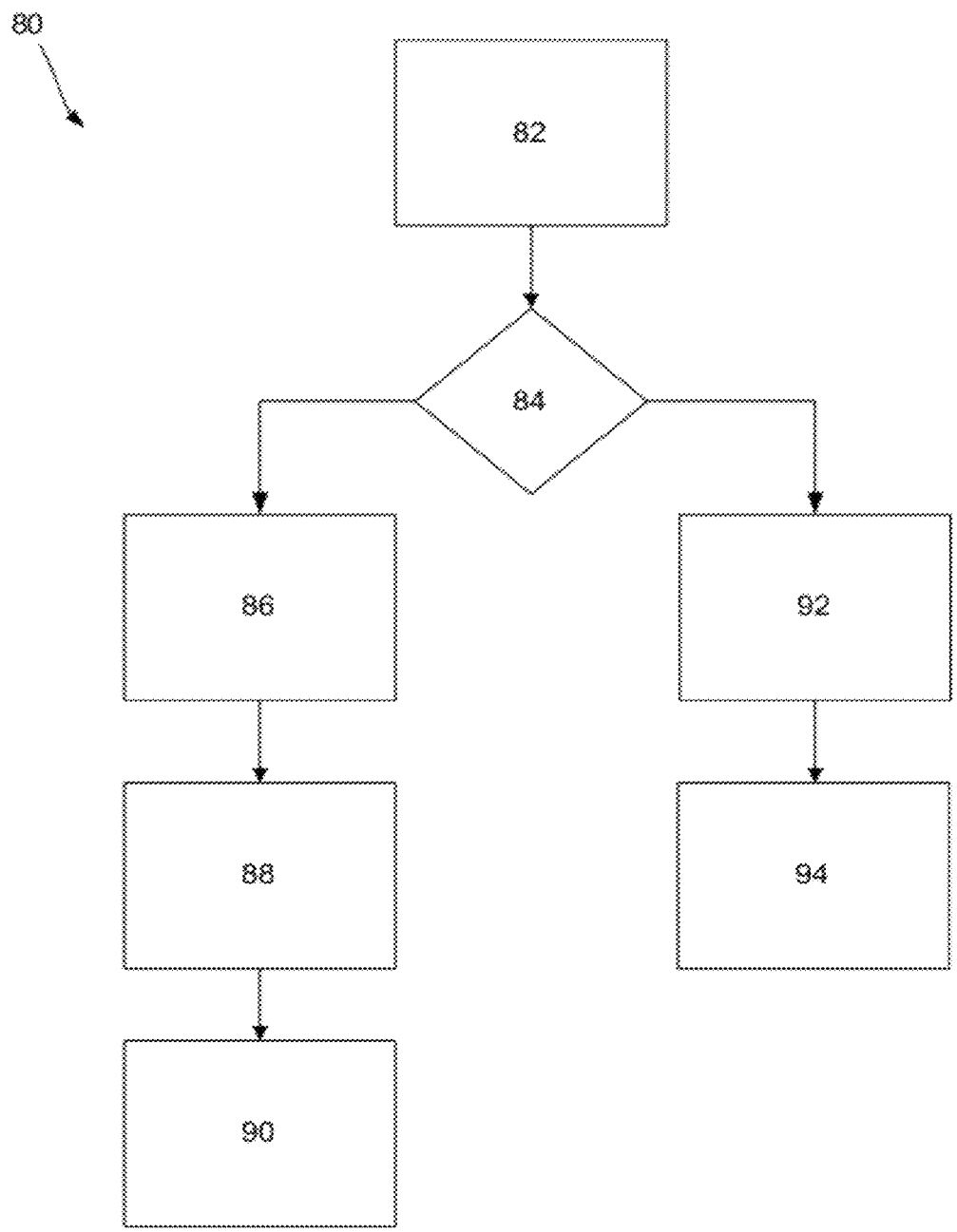
FIG. 3 is a flow chart diagram of a process for managing the temperature in the battery pack during driving operations and charging operations.

FIG. 3 is a flow chart diagram 80 of a process which can be used by the controller 22 to manage the operation of the cooling system 18 so as to maximize vehicle driving range while protecting the longevity of the battery pack 14. At box 82, the curve 46 is defined which prescribes the maximum allowable temperature in the battery pack 14 as a function of state of charge (SoC). While the curve 46 is shown on the graph 40 as a generic shape with no values given for temperature or state of charge, in actual practice the curve 46 would be specifically defined so that a maximum allowable temperature (in degrees Celsius, for example) could be looked up for any given state of charge from 0% through 100%.

At decision diamond 84, the process branches, depending on whether the vehicle 12 is being driven or being charged. During driving operations, at box 86, the temperature and state of charge of the battery pack (BP) 14 are monitored continuously by the controller 22. At box 88, the battery pack temperature is allowed to rise as state of charge falls during driving operation, as long as the temperature in the battery pack 14 remains below the curve 46. There may be situations involving intermittent driving or low ambient temperature where the temperature in the battery pack 14 never reaches the curve 46 and the cooling system 18 never needs to be used. At box 90, if the battery pack temperature reaches the curve 46, then the cooling system 18 is engaged and operated as necessary to maintain the temperature prescribed by the curve 46, which will continue to rise as the battery pack state of charge drops.

During charging operations, at box 92, the temperature and state of charge of the battery pack 14 are monitored continuously by the controller 22. At box 94, the cooling system 18 is engaged and operated as necessary to maintain the temperature in the battery pack 14 at or below the curve 46 as the state of charge rises. Variations on the cooling control strategy are possible, including an approach where the cooling system is operated only as necessary during charging to keep the battery pack temperature below the curve 46 until the battery pack 14 is fully charged at the point 48. Another approach would be to operate the cooling system 18 continuously during charging, with a goal of lowering the battery pack temperature significantly below the point 48. This approach of pre-cooling the battery pack 14 would allow more subsequent driving without the use of the cooling system 18, and may be a good strategy in high ambient temperature environments. On the other hand, it is possible that the cooling system 18 would not need to be operated at all during charging. This could happen in low ambient temperature conditions, especially if the vehicle 12 is cold soaked after driving before recharging is started. In any case, whether the cooling strategy is aggressive or conservative during charging, the power for both charging and cooling is provided by the electrical grid.

By using the control strategies described above, significant improvements in electric vehicle driving range can be realized, as energy is not used unnecessarily to remove heat from the battery pack 14 while driving. Also, by using a control strategy which reduces the rate at which heat must be removed from the battery pack 14, the cooling system 18 can be made smaller, lighter, quieter, and less expensive—all of which are good for manufacturers and consumers of electric vehicles.

An additional benefit of the present invention is that the life of the battery pack 14 may be more consistent and predictable across a wide range of electric vehicle users and usage profiles. The reduced variability in battery pack life stems from the fact that the curve 46 follows a profile which maintains the battery pack 14 at a low and fairly uniform degradation rate, whereas traditional electric vehicle battery pack thermal management systems allow degradation rates to vary widely, such that a battery pack 14 which spends most of its time nearly fully charged may have a much shorter life than one which spends much of its time in a lower state of charge. The reduced variability in battery pack life exhibited by the present invention allows an electric vehicle manufacturer to offer battery pack leasing or replacement programs which are suitable to both the manufacturer and the consumer.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for thermal management of a battery pack, said method comprising:

defining a maximum allowable temperature in the battery pack which is a function of state of charge of the battery pack, where the defined maximum allowable temperature increases as the state of charge decreases;

measuring temperature in the battery pack and the state of charge of the battery pack during discharging of the battery pack and charging of the battery pack, where the state of charge last measured is designated as current state of charge; and controlling the temperature in the battery pack to prevent the temperature in the battery pack from exceeding the maximum allowable temperature for the current state of charge.

2. The method of claim 1 wherein controlling the temperature in the battery pack includes allowing the temperature in the battery pack to rise as the state of charge of the battery pack falls during discharging, and removing heat from the battery pack only as necessary to prevent the temperature in the battery pack from exceeding the maximum allowable temperature for the current state of charge.

3. The method of claim 1 wherein controlling the temperature in the battery pack includes removing heat from the battery pack during charging to prevent the temperature in the battery pack from exceeding the maximum allowable temperature for the current state of charge.

4. The method of claim 3 wherein controlling the temperature in the battery pack includes removing heat from the battery pack during charging until the temperature in the battery pack is lowered to the maximum allowable temperature at a full state of charge condition.

5. The method of claim 3 wherein controlling the temperature in the battery pack includes removing heat from the battery pack during charging until the temperature in the battery pack is lowered to a temperature below the maximum allowable temperature at a full state of charge condition.

6. The method of claim 1 wherein controlling the temperature in the battery pack includes controlling the flow of a cooling fluid through the battery pack to remove heat from the battery pack.

7. The method of claim 1 wherein the battery pack is used in an electric vehicle.

8. The method of claim 1 wherein the battery pack is a lithium-ion battery pack.

9. A method for thermal management of a lithium-ion battery pack in an electric vehicle, said method comprising:

defining a maximum allowable temperature in the battery pack which is a function of state of charge of the battery pack, where the defined maximum allowable temperature increases as the state of charge decreases;

measuring temperature in the battery pack and the state of charge of the battery pack during discharging of the battery pack and charging of the battery pack, where the state of charge last measured is designated as current state of charge; and controlling the temperature in the battery pack to prevent the temperature in the battery pack from exceeding the maximum allowable temperature for the current state of charge, where controlling the temperature in the battery pack includes allowing the temperature in the battery pack to rise as the state of charge of the battery pack falls during discharging, and removing heat from the battery pack only as necessary to prevent the temperature in the battery pack from exceeding the maximum allowable temperature for the current state of charge.

10. The method of claim 9 wherein controlling the temperature in the battery pack includes removing heat from the battery pack during charging to prevent the temperature in the battery pack from exceeding the maximum allowable temperature for the current state of charge.

11. The method of claim 10 wherein controlling the temperature in the battery pack includes removing heat from the battery pack during charging until the temperature in the battery pack is lowered to the maximum allowable temperature at a full state of charge condition.

12. The method of claim 10 wherein controlling the temperature in the battery pack includes removing heat from the battery pack during charging until the temperature in the battery pack is lowered to a temperature below the maximum allowable temperature at a full state of charge condition.

13. The method of claim 9 wherein controlling the temperature in the battery pack includes using a thermal storage system which uses heat from the battery pack to warm an interior space of the vehicle as needed, and dissipates excess heat to the environment.

14. The method of claim 9 wherein controlling the temperature in the battery pack includes controlling the flow of a cooling fluid through the battery pack to remove heat from the battery pack.

15. A thermal management system for a battery pack providing electrical energy to an apparatus, said thermal management system comprising:
   a plurality of sensors for measuring state of charge of the battery pack and temperature in the battery pack, where the state of charge last measured is designated as current state of charge;
   a cooling system and cooling lines for removing heat from the battery pack; and
   a controller for managing the temperature in the battery pack, where the controller is configured to control the temperature in the battery pack as a function of the state of charge of the battery pack, such that the maximum allowable temperature increases as the state of charge decreases, and the controller uses the cooling system and the cooling lines to control the temperature in the battery pack.

16. The thermal management system of claim 15 wherein the controller is configured to allow the temperature in the battery pack to rise as the state of charge of the battery pack falls during discharging, and use the cooling system to remove heat from the battery pack only as necessary to prevent the temperature in the battery pack from exceeding the maximum allowable temperature for the current state of charge.

17. The thermal management system of claim 15 wherein the controller is configured to use the cooling system to remove heat from the battery pack during charging to prevent the temperature in the battery pack from exceeding the maximum allowable temperature for the current state of charge.

18. The thermal management system of claim 17 wherein the controller is configured to use the cooling system to remove heat from the battery pack during charging until the temperature in the battery pack is lowered to a temperature below the maximum allowable temperature at a full state of charge condition.

19. The thermal management system of claim 15 wherein the battery pack is a lithium-ion battery pack and the apparatus is an electric vehicle.

20. The thermal management system of claim 19 wherein the cooling system is a thermal storage system which uses the heat from the battery pack to warm an interior space of the vehicle as needed, and dissipates excess heat to the environment.

* * * * *